(12) United States Patent
Wagner

(10) Patent No.: US 12,325,398 B2
(45) Date of Patent: Jun. 10, 2025

(54) VEHICLE BRAKE PEDAL WITH LINEAR PEDAL RESISTANCE AND ROTARY DAMPENER/POSITION SENSOR ASSEMBLIES

(71) Applicant: CTS Corporation, Lisle, IL (US)

(72) Inventor: Ryan Andrew Wagner, Goshen, IN (US)

(73) Assignee: CTS Corporation, Lisle, IL (US)

(*) Notice: Subject to any disclaimer, the term of this patent is extended or adjusted under 35 U.S.C. 154(b) by 434 days.

(21) Appl. No.: 17/657,592

(22) Filed: Mar. 31, 2022

(65) Prior Publication Data

US 2022/0314939 A1    Oct. 6, 2022

Related U.S. Application Data

(60) Provisional application No. 63/169,976, filed on Apr. 2, 2021.

(51) Int. Cl.
*B60T 7/06* (2006.01)
*B60T 13/58* (2006.01)
(Continued)

(52) U.S. Cl.
CPC ............... *B60T 7/06* (2013.01); *B60T 13/58* (2013.01); *B60T 17/18* (2013.01); *F16D 65/02* (2013.01)

(58) Field of Classification Search
CPC ...................................................... B60T 13/58
See application file for complete search history.

(56) References Cited

U.S. PATENT DOCUMENTS 6,253,635 B1 *  7/2001  Huber .................. G05G 1/30
                                                         267/44
6,367,886 B1    4/2002  Shaw
(Continued)

FOREIGN PATENT DOCUMENTS

CN    109204271 A   *  1/2019  .............. B60T 7/06
DE    102018100072 A1    8/2018
(Continued)

OTHER PUBLICATIONS

International Search Report and Written Opinion for Application No. PCT/US2022/071488 dated Jul. 27, 2022 (15 pages).
(Continued)

*Primary Examiner* — Melody M Burch
(74) *Attorney, Agent, or Firm* — Michael Best & Friedrich LLP

(57) ABSTRACT

A vehicle brake pedal including a base and a pedal arm coupled to and rotatable relative to the base. A linear pedal resistance assembly extends between the base and the pedal arm and is adapted for exerting a resistance force against the pedal arm in response to the rotation of the pedal arm. A rotary pedal dampener assembly is associated with the base and adapted for exerting a dampening force against the pedal arm in response to the rotation of the pedal arm. A rotary pedal position sensor assembly is associated with the base and adapted for sensing the position of the pedal arm in response to the rotation of the pedal arm. In one embodiment, the linear pedal resistance assembly includes a housing with a plurality of springs adapted for compression in response to the rotation of the pedal arm and for exerting the resistance force against the pedal arm.

14 Claims, 2 Drawing Sheets

(51) Int. Cl.
  *B60T 17/18* (2006.01)
  *F16D 65/02* (2006.01)

(56) References Cited

U.S. PATENT DOCUMENTS

| | | |
|---|---|---|
| 2002/0108463 A1 | 8/2002 | Shaw et al. |
| 2006/0224284 A1 | 10/2006 | Ueno et al. |
| 2012/0007419 A1 | 1/2012 | Sellinger et al. |
| 2018/0093648 A1 | 4/2018 | Pennala et al. |
| 2018/0208162 A1 * | 7/2018 | Street ............ B60T 7/042 |
| 2019/0232928 A1 | 8/2019 | Adachi et al. |
| 2020/0353908 A1 | 11/2020 | Street et al. |

FOREIGN PATENT DOCUMENTS

| | | | |
|---|---|---|---|
| DE | 102017104278 A1 | 9/2018 | |
| EP | 2160307 B1 | 1/2011 | |
| EP | 2387521 B1 * | 7/2019 | ............ B60T 13/573 |
| FR | 2768678 A1 * | 3/1999 | ............ B60T 7/042 |
| JP | 2006264579 A | 10/2006 | |
| WO | 2015074654 A1 | 5/2015 | |
| WO | 2020227380 A1 | 11/2020 | |

OTHER PUBLICATIONS

European Patent Office. Extended European Patent Office for Application No. 22782432.3, dated Jan. 14, 2025 (8 pages).

* cited by examiner

VEHICLE BRAKE PEDAL WITH LINEAR PEDAL RESISTANCE AND ROTARY DAMPENER/POSITION SENSOR ASSEMBLIES

CROSS-REFERENCE TO RELATED APPLICATION

This patent application claims priority and benefit of the filing date of U.S. Provisional Patent Application Ser. No. 63/169,976 filed on Apr. 2, 2021, the disclosure and contents of which are expressly incorporated by reference in its entirety herein.

FIELD OF THE INVENTION

This invention relates to a vehicle brake pedal with a linear pedal resistance assembly, a rotary dampener assembly, and a rotary position sensor assembly.

BACKGROUND OF THE INVENTION

Brake-by-wire vehicle brake pedals do not utilize a conventional vacuum or hydraulic system for braking.

There is a desire to replicate or emulate the feel of a conventional vacuum or hydraulic braking system in brake-by-wire vehicle brake pedals.

The present invention is directed to a brake-by-wire vehicle brake pedal including a linear pedal resistance assembly and a rotary dampener assembly which together replicate or emulate the resistance and dampener feel of a conventional vacuum or hydraulic braking system.

The present invention is also directed to a linear pedal resistance assembly that incorporates a pedal force sensor and a rotary pedal position sensor assembly.

SUMMARY OF THE INVENTION

The present invention is generally directed to a vehicle brake pedal comprising a base, a pedal arm coupled to and rotatable relative to the base, a linear pedal resistance assembly extending between the base and the pedal arm and adapted for exerting a resistance force against the pedal arm in response to the rotation of the pedal arm, a rotary pedal dampener assembly associated with the base and adapted for exerting a dampening force against the pedal arm in response to the rotation of the pedal arm, and a rotary pedal position sensor assembly associated with the base and adapted for sensing the position of the pedal arm in response to the rotation of the pedal arm.

In one embodiment, the linear pedal resistance assembly includes a housing with a plurality of springs adapted for compression in response to the rotation of the pedal arm and for exerting the resistance force against the pedal arm.

In one embodiment, the linear pedal resistance assembly includes a pedal force sensor.

In one embodiment, the vehicle brake pedal further comprises a shaft on the base, the pedal arm being coupled to and rotatable relative to the shaft, the rotary pedal dampener assembly and the rotary pedal position sensor being positioned in a relationship co-linear with the shaft.

Other advantages and features of the present invention will be more readily apparent from the following detailed description of the embodiment of the invention, the accompanying drawings, and the appended claims.

BRIEF DESCRIPTION OF THE DRAWINGS

These and other features of the invention can best be understood by the description of the accompanying Figs. as follows.

DESCRIPTION OF THE EMBODIMENT

Figure 1:
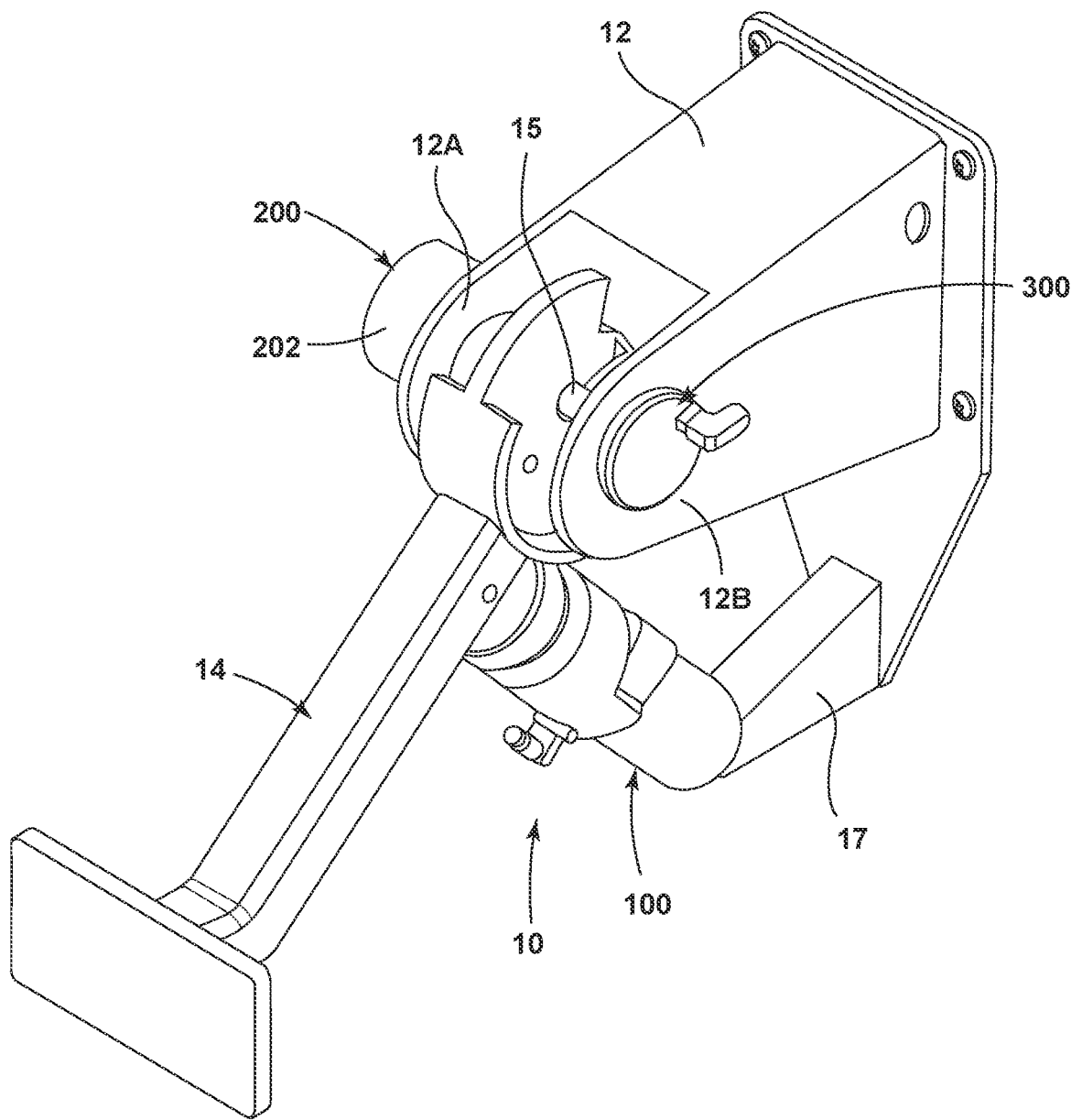
FIG. 1 is a perspective view of a vehicle brake pedal incorporating the linear pedal resistance, rotary dampener, and rotary position sensor assemblies in accordance with the present invention.

FIG. 1 depicts a vehicle brake pedal assembly 10 incorporating a linear pedal resistance assembly or module or member or emulator 100, a rotary pedal resistance/dampener assembly 200, and a rotary brake pedal position sensor assembly 300 in accordance with the present invention.

The vehicle brake pedal assembly 10 includes a base/bracket 12 and an elongate brake pedal arm 14 that is pivotally connected at one end to a shaft 15 extending between spaced apart base/bracket arms 12A and 12B on the base/bracket 12 for allowing the counterclockwise/engaging/braking and clockwise/disengaging/non-braking rotation and movement of the pedal arm 14 relative to the pedal base/bracket 12. The shaft 15 defines the rotational pivot point and axis for the pedal arm 14.

Figure 2:
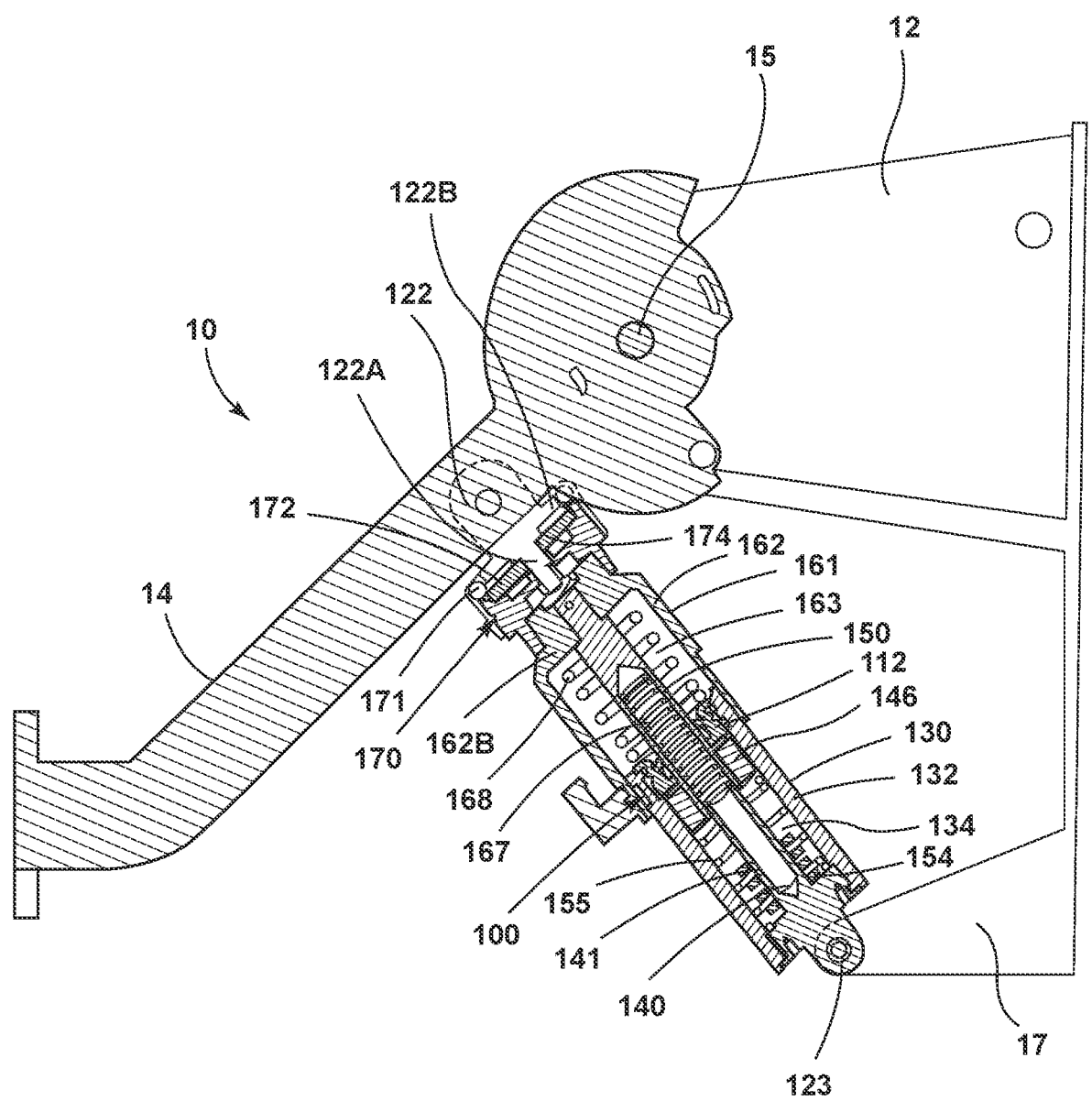
FIG. 2 is a vertical cross-sectional view of the vehicle brake pedal shown in FIG. 1.

The linear pedal resistance assembly 100 is operably coupled to the brake pedal assembly 10 in a relationship extending between an arm 17 on the base/bracket 12 and the underside of the pedal arm 14 and further in a relationship with a first end bracket or ball stud 122 thereof operatively coupled to the underside of the pedal arm 14 and a second opposed end bracket or adjustable eyelet 123 shown in FIG. 2 that is coupled to the arm 17 on the pedal base/bracket 12.

The linear pedal resistance assembly 100 is generally in the form and shape of an elongate hollow cylinder or housing or tube including a first central generally cylindrical elongate hollow interior cylinder or tubular housing or sleeve 130 including an exterior circumferential wall 132 defining and forming an interior hollow elongate cylindrically or tubular shaped receptacle or cavity or chamber 134.

A first sealing cap or cartridge or gland or retainer 112 covers and seals one end of the sleeve 130. The end bracket 123 includes outer threads for securement to inner threads of the sleeve 130 and covers and seals the opposed end of the sleeve 130.

The pedal resistance assembly 100 further comprises an elongate shaft or rod 140 extending generally centrally through the interior of the chamber 134 of the sleeve 130 in a relationship generally co-linear with the longitudinal axis of the sleeve 130 and the pedal resistance assembly 100.

The shaft or rod 140 includes a first end extending through and secured in the interior of a circumferential sleeve bracket or collar 141 that extends from the end bracket 123 and inwardly into the interior of the chamber 134 within the sleeve 130. The opposed end of the shaft or rod 140 extends into the interior of a second cylindrical sleeve 150 that extends through the sealing cap or gland or retainer 112 and into the interior of the chamber 134 of the sleeve 130.

A pedal dampener piston 146 is in the chamber 134 of the sleeve 130 and is secured to and surrounds an end of the second sleeve 150. The pedal dampener piston 146 is moveable linearly in the interior of the cavity 134 and along the longitudinal axis of both the sleeve 130 and the pedal resistance and dampener assembly 100.

A pair of resistance or helical springs 154 and 155 are also located in the chamber 134 of the sleeve 130. The resistance spring 154 surrounds the sleeve bracket or collar 141 and includes a first end abutted against the end bracket 123. The resistance spring 155 surrounds and is spaced from the resistance spring 154 and the sleeve bracket or collar 141 and includes one end abutted against the end bracket 123 and an opposed end abutted against the pedal dampener piston 146.

The pedal resistance assembly 100 still further comprises a circumferentially extending and generally tubular shaped shroud 161 that includes a circumferentially extending outer wall 162 defining an interior chamber 163 and including a first open end surrounding the wall 132 of the sleeve 130 of the pedal resistance assembly or module 100 and an opposed radial end wall defining a closed opposed end.

The second sleeve 150 extends through the interior chamber 163 of the shroud 161 in a relationship co-linear with the longitudinal axis of the pedal resistance assembly 100 and into the interior chamber 134 of the sleeve 130.

A resistance helical spring 167 is in and extends longitudinally through the interior of the second sleeve 150 in a relationship co-linear with the longitudinal axis of the pedal resistance assembly 100. A first end of the helical spring 167 surrounds an end of the shaft or rod 140.

A resistance helical spring 168 is located in and extends longitudinally through the interior of the chamber 163 of the shroud 161 in a relationship co-linear with the longitudinal axis of the pedal resistance assembly 100 and further in a relationship surrounding and spaced from the second sleeve 150 with a first end abutted against the retainer 112 surrounding the sleeve 150 and an opposed end abutted against the closed end wall 162<sub>6</sub> of the shroud 161.

The pedal resistance assembly 100 still further comprises a pedal force sensing module or member or assembly 170 comprising a housing 171 for a force sensor plate 172 and a force sensor substrate 174 which are abutted against each other. Housing 171 and thus the pedal force sensing module 170 are located between the bracket 122 and the shroud 161.

In one embodiment, the force sensor substrate 174 is in the embodiment of a strain gauge substrate with Wheatstone bridge strain gauge elements (not shown) mounted thereon as known in the art which are adapted to generate electrical signals in response to the deformation of the substrate in response to the application of a compressive force thereon by the force sensor plate 172 and the ball stud 122 in response to the depression of the vehicle pedal arm 14.

The pedal force sensing module or member 170 further comprises the ball stud or bracket 122 that includes a collar 122B abutted against the exterior face of the force sensor plate 172 and a shaft 122A that extends through the center of the force sensor plate 172 and the housing 171. The ball stud 122, the collar 122B, and the threaded shaft 122A are all positioned in a relationship co-linear with the longitudinal axis of the linear pedal resistance assembly 100.

In the embodiment shown, the stage 1 outer pedal force resistance spring 155, the stage 1 inner pedal force resistance spring 167, the stage 2 pedal force resistance helical spring 168, and the stage 3 pedal force resistance spring 154 are all positioned and oriented in a relationship co-linear with each other and the longitudinal axis of the pedal resistance assembly 100.

Still further, in the embodiment shown, the stage 1 resistance outer spring 155 surrounds and is spaced from the stage 3 resistance spring 154 and both are located and positioned at one end of the pedal resistance assembly 100 between the inner part of the end bracket 123 and the piston 146 of the pedal resistance assembly 100 while the stage 2 resistance spring 168 surrounds and is spaced from the stage 1 inner pedal force resistance spring 167 and both are located and positioned at the opposed end of the pedal resistance assembly 100 between the end wall 162B and the gland 112 of the resistance module 160.

Thus, in the embodiment shown, the pedal resistance assembly 100 includes a total of four pedal force resistance springs with two such resistance springs 154 and 155 located at one end of the pedal resistance assembly 100 and the other two such resistance springs 167 and 168 located at the opposed end of the linear pedal resistance assembly 100 with the pedal dampener piston 146 positioned and located between and separating the resistance springs 154 and 155 from the resistance springs 167 and 168.

Also, in the embodiment shown, the pedal force sensing module 170 is located at one end of the pedal resistance assembly 100.

The pedal resistance assembly 100 is adapted to create and generate linear resistance and dampening forces on the pedal arm 14 in response to the travel or movement or stroke of the pedal arm 14 during operation of a vehicle with a brake-by-wire system and which emulates the resistance and dampening feel of a vehicle with a conventional vacuum or hydraulic braking system.

It is further understood that the depression of the vehicle pedal arm 14 results in the exertion of a linear compressive force by the ball stud 122 against the force sensor plate 172 of the pedal force sensing module 170 which in turn results in the deformation of the force sensor substrate 174 which in turn results in the generation of an electric signal which is communicated to an electronic control unit (not shown). The electronic control unit is coupled to the pedal force sensing module 170 to receive the sensed and measured force of the vehicle pedal arm 14.

The rotary pedal resistance/dampener assembly 200 is comprised of an outer hollow cylinder or housing or tube or housing 202 as shown in FIG. 1 that is coupled to and extends outwardly from the exterior face of the base/bracket arm 12A.

Although not show in the Figs., it is understood that the interior of the rotary pedal resistance/dampener assembly 200 incorporates suitable spring or the like structure for generating and applying a resistive or dampening force against the pedal arm 14 through the shaft 15 in response to the rotation of the pedal arm 14.

The rotary brake pedal position sensor assembly 300 extends outwardly from the exterior face of the other base/bracket arm 12B in a relationship co-linear with and spaced from the rotary pedal resistance/dampener assembly 200.

The assemblies 200 and 300 are positioned in a relationship co-linear with the shaft 15.

Although not shown in the Figs, it is understood that the rotary pedal position sensor assembly 300 incorporates suitable contacting or non-contacting structure for allowing the position of the pedal arm 14 to be determined in response to the rotation of the pedal arm 14 relative to the pedal base/bracket 12 including, for example, a non-contacting Hall effect sensor structure comprising a magnet on the radial end face of the shaft 15 and a Hall effect sensor, such as a Hall effect sensor integrated circuit (IC), in the interior of the housing of the rotary pedal position sensor assembly 300 which is adapted to sense changes in the magnitude and/or direction of the magnetic field generated by the magnet coupled to the shaft 15 for sensing and measuring the rotational position of the shaft 15 and thus for sensing and measuring the position of the pedal arm 14.

Numerous variations and modifications of the embodiment of the vehicle brake pedal of the present invention as described above may be effected without departing from the spirit and scope of the novel features of the invention. It is to be understood that no limitations with respect to the embodiment illustrated herein are intended or should be inferred. It is, of course, intended to cover by the appended claims all such modifications as fall within the scope of the claims.

What is claimed is:

1. A vehicle brake pedal comprising:
   a base;
   a shaft on the base;
   a pedal arm pivotally connected to the shaft and rotatable relative to the base;
   a linear pedal resistance assembly extending between the base and the pedal arm and adapted for exerting a resistance force against the pedal arm in response to the rotation of the pedal arm; wherein the linear pedal resistance assembly includes:
      a housing;
      a first end bracket including a ball stud and operatively coupled to an underside of the pedal arm,
      a second opposed end bracket including an adjustable eyelet and coupled to the base, and
      a plurality of springs adapted for compression in response to the rotation of the pedal arm and for exerting the resistance force against the pedal arm;
   a rotary pedal dampener assembly associated with the base and adapted for exerting a dampening force against the pedal arm in response to the rotation of the pedal arm; and
   a rotary pedal position sensor assembly associated with the base and adapted for sensing the position of the pedal arm in response to the rotation of the pedal arm,
   wherein a pedal force sensor includes a force sensor plate, and wherein the ball stud includes a collar abutted against an exterior face of the force sensor plate, and
   wherein the rotary pedal dampener assembly and the rotary pedal position sensor assembly being positioned in a relationship co-linear with the shaft.

2. The vehicle brake pedal of claim 1, wherein the linear pedal resistance assembly includes a housing with a plurality of springs adapted for compression in response to the rotation of the pedal arm and for exerting the resistance force against the pedal arm.

3. The vehicle brake pedal of claim 1, wherein the linear pedal resistance assembly includes a sleeve in a shape of an elongate hollow cylinder defined by an exterior circumferential wall in the interior of the housing.

4. The vehicle brake pedal of claim 3, wherein the linear pedal resistance assembly includes a sealing cap covering and sealing one end of the sleeve.

5. The vehicle brake pedal of claim 3, wherein the linear pedal resistance assembly includes a shaft extending generally centrally through the elongate hollow cylinder in a relationship generally co-linear with the longitudinal axis of the sleeve and the linear pedal resistance assembly.

6. The vehicle brake pedal of claim 3, wherein the plurality of springs adapted for compression in response to the rotation of the pedal arm and for exerting the resistance force against the pedal arm include:
   first and second springs in one end of the housing, the first and second springs being compressible in response to the sliding movement of the sleeve in the interior of the housing; and
   third and fourth springs in an opposed end of the housing, the third and fourth springs being compressible in response to the sliding movement of the sleeve in the interior cavity of the housing.

7. A vehicle brake pedal comprising:
   a base;
   a pedal arm coupled to and rotatable relative to the base;
   a linear pedal resistance assembly extending between the base and the pedal arm and adapted for exerting a resistance force against the pedal arm in response to the rotation of the pedal arm, the linear pedal resistance assembly including:
      a housing;
      a pedal force sensor having a force sensor plate;
      a first end bracket operatively coupled to an underside of the pedal arm, the first end bracket including a ball stud having a collar abutted against an exterior face of the force sensor plate;
      a second opposed end bracket coupled to the base; and
      a plurality of springs adapted for compression in response to the rotation of the pedal arm and for exerting the resistance force against the pedal arm; and
   a rotary pedal dampener assembly associated with the base and adapted for exerting a dampening force against the pedal arm in response to the rotation of the pedal arm.

8. The vehicle brake pedal of claim 7, further including a rotary pedal position sensor assembly associated with the base and adapted for sensing the position of the pedal arm in response to the rotation of the pedal arm.

9. The vehicle brake pedal of claim 8, further comprising a shaft on the base, the pedal arm being coupled to and rotatable relative to the shaft, the rotary pedal dampener assembly and the rotary pedal position sensor assembly being positioned in a relationship co-linear with the shaft.

10. The vehicle brake pedal of claim 7, wherein the second opposed end bracket includes an adjustable eyelet.

11. The vehicle brake pedal of claim 7, wherein the linear pedal resistance assembly includes a sleeve in a shape of an elongate hollow cylinder defined by an exterior circumferential wall in the interior of the housing.

12. The vehicle brake pedal of claim 11, wherein the linear pedal resistance assembly includes a sealing cap covering and sealing one end of the sleeve.

13. A vehicle brake pedal comprising:
   a base;
   a pedal arm coupled to and rotatable relative to the base;
   a linear pedal resistance assembly extending between the base and the pedal arm and adapted for exerting a resistance force against the pedal arm in response to the rotation of the pedal arm, the linear pedal resistance assembly including:
      a housing;
      a first end bracket operatively coupled to an underside of the pedal arm;
      a second opposed end bracket coupled to the base;
      a sleeve in a shape of an elongate hollow cylinder; and
      a plurality of springs adapted for compression in response to the rotation of the pedal arm and for exerting the resistance force against the pedal arm; and
   a rotary pedal dampener assembly associated with the base and adapted for exerting a dampening force against the pedal arm in response to the rotation of the pedal arm, wherein the plurality of springs adapted for compression in response to the rotation of the pedal arm and for exerting the resistance force against the pedal arm include first and second springs in one end of the housing, the first and second springs being compressible in response to the sliding movement of the sleeve in the interior of the housing, and wherein the plurality of springs adapted for compression in response to the rotation of the pedal arm and for exerting the resistance force against the pedal arm include third and fourth springs in an opposed end of the housing, the third and fourth springs being compressible in response to the sliding movement of the sleeve in the interior cavity of the housing.

14. The vehicle brake pedal of claim 13, wherein the sleeve in the shape of the elongate hollow cylinder is defined by an exterior circumferential wall in the interior of the housing.

* * * * *